United States Patent
Macwan

(10) Patent No.: US 9,160,975 B2
(45) Date of Patent: Oct. 13, 2015

(54) PROVIDING A DEDICATED CHANNEL ACCESSIBLE TO A GROUP OF USERS

(75) Inventor: Sanjay Macwan, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 818 days.

(21) Appl. No.: 12/567,332

(22) Filed: Sep. 25, 2009

(65) Prior Publication Data

US 2011/0078716 A1    Mar. 31, 2011

(51) Int. Cl.
*H04N 7/173* (2011.01)
*H04H 60/32* (2008.01)

(52) U.S. Cl.
CPC ............. *H04N 7/173* (2013.01); *H04H 60/32* (2013.01)

(58) Field of Classification Search
CPC .................................................. H04N 21/4788
USPC ........................................ 725/14, 95, 109, 17
See application file for complete search history.

(56) References Cited

U.S. PATENT DOCUMENTS

| | | | | |
|---|---|---|---|---|
| 6,754,904 | B1 * | 6/2004 | Cooper et al. | 725/32 |
| 6,774,926 | B1 * | 8/2004 | Ellis et al. | 348/14.01 |
| 7,603,683 | B2 * | 10/2009 | Reto | 725/34 |
| 8,819,120 | B1 * | 8/2014 | Wang et al. | 709/203 |
| 2003/0093445 | A1 * | 5/2003 | Schick et al. | 707/205 |
| 2003/0233650 | A1 * | 12/2003 | Zaner et al. | 725/32 |
| 2004/0041836 | A1 * | 3/2004 | Zaner et al. | 345/751 |
| 2005/0262542 | A1 * | 11/2005 | DeWeese et al. | 725/106 |
| 2006/0123455 | A1 * | 6/2006 | Pai et al. | 725/133 |
| 2006/0242639 | A1 * | 10/2006 | Manion et al. | 717/169 |
| 2006/0271960 | A1 * | 11/2006 | Jacoby et al. | 725/46 |
| 2006/0281555 | A1 * | 12/2006 | Kellerman et al. | 463/42 |
| 2007/0143817 | A1 | 6/2007 | Conradt et al. | |
| 2007/0157266 | A1 * | 7/2007 | Ellis et al. | 725/89 |
| 2007/0198738 | A1 * | 8/2007 | Angiolillo et al. | 709/231 |
| 2008/0276279 | A1 * | 11/2008 | Gossweiler et al. | 725/46 |
| 2009/0049098 | A1 * | 2/2009 | Pickelsimer et al. | 707/104.1 |
| 2009/0063995 | A1 * | 3/2009 | Baron et al. | 715/753 |
| 2009/0215532 | A1 * | 8/2009 | Terlizzi | 463/31 |
| 2009/0293079 | A1 * | 11/2009 | McKee et al. | 725/10 |
| 2010/0037277 | A1 * | 2/2010 | Flynn-Ripley et al. | 725/110 |
| 2010/0138746 | A1 * | 6/2010 | Zarom | 715/720 |
| 2010/0287586 | A1 * | 11/2010 | Walter et al. | 725/34 |

FOREIGN PATENT DOCUMENTS

EP    1826981 A1    8/2007

* cited by examiner

*Primary Examiner* — Hunter B Lonsberry
*Assistant Examiner* — Alexander Q Huerta
(74) *Attorney, Agent, or Firm* — Toler Law Group, PC

(57) ABSTRACT

A system includes a service provider network configured to communicate with a plurality of television-based user devices. The system also includes a database storing a status of user activity with respect to each of the plurality of television-based user devices and storing indicators of user-defined relationships between respective users of the plurality of television-based user devices. The system further includes a dedicated channel accessible to a group of users of the plurality of television-based user devices. The dedicated channel is arranged to enable interactive activity between members of the group.

20 Claims, 10 Drawing Sheets

PROVIDING A DEDICATED CHANNEL ACCESSIBLE TO A GROUP OF USERS

FIELD OF THE DISCLOSURE

The present disclosure is generally related to providing a dedicated channel accessible to a group of users.

BACKGROUND

A user of a television-based user device communicating with a service provider network, such as an internet protocol television (IPTV) network or a cable television (CATV) network, is typically unaware of the status of user activity of users of other television-based user devices. Members of a group of users of the television-based user devices may be unable to engage in interactive activities with each other by use of their television-based user devices.

DETAILED DESCRIPTION

Figure 1:
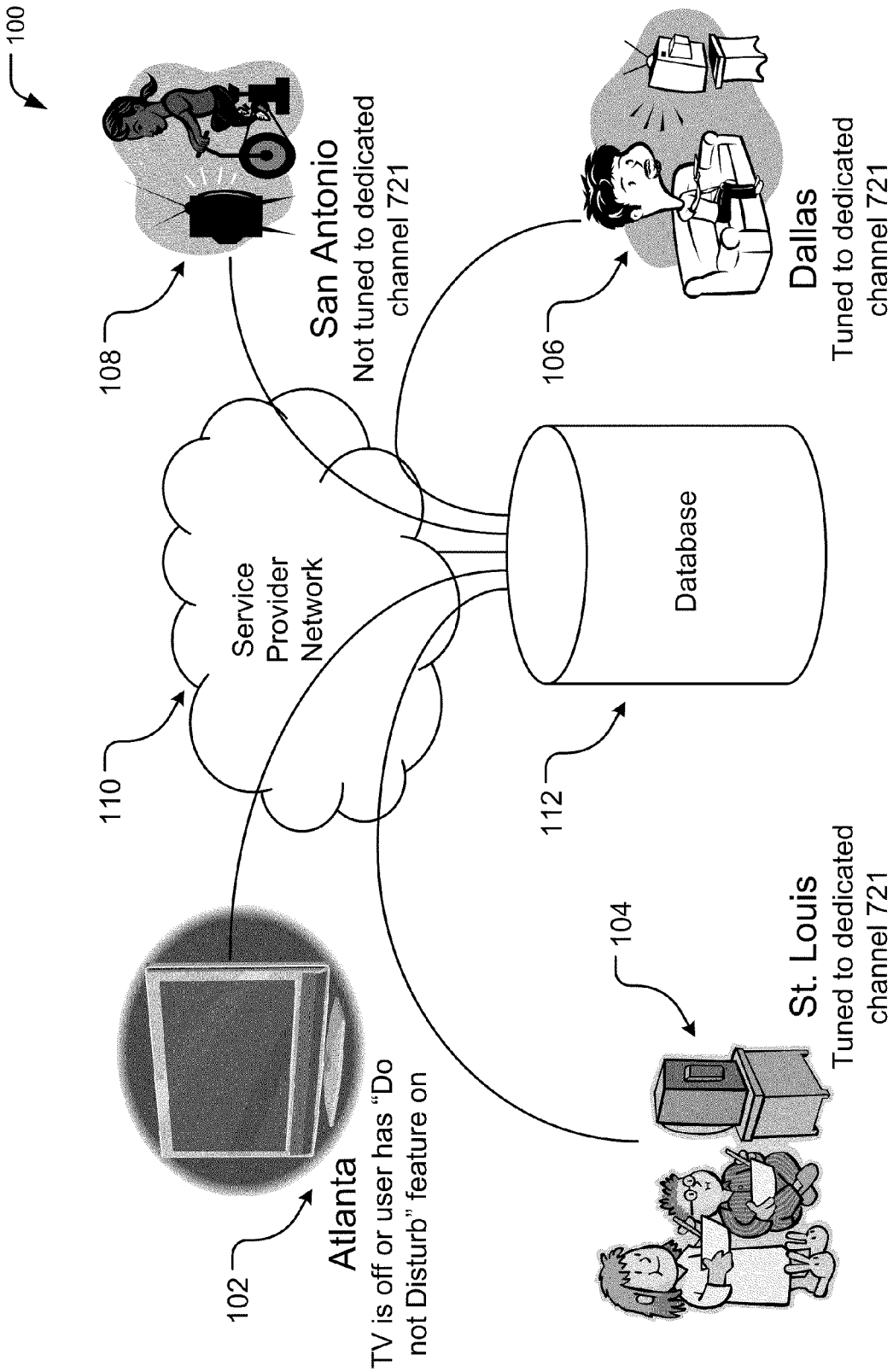
FIG. 1 is a block diagram of a first particular embodiment of a system to provide a dedicated channel accessible to a group of users.

The various embodiments disclose a system and method to provide a dedicated channel accessible to a group of users of television-based user devices. Users of the television-based user devices communicating with a service provider network, such as an internet protocol television (IPTV) network or a cable television (CATV) network, are able to monitor the status of user activity of other users of the television-based user devices. A dedicated channel, such as a IPTV/CATV enabled social networking channel, accessible to a group of users of the television-based user devices is provided so that the members of the group of users, such as a IPTV/CATV enabled social networking group, are able to engage in interactive activities with each other such as video conferencing, game playing, picture sharing, watching particular content together, or recommending content to each other.

In a particular embodiment, a system is disclosed that includes a service provider network configured to communicate with a plurality of television-based user devices. The system also includes a database storing a status of user activity with respect to each of the plurality of television-based user devices and storing indicators of user-defined relationships between respective users of the plurality of television-based user devices. The database is coupled to the service provider network. The system further includes a dedicated channel accessible to a group of users of the plurality of television-based user devices based on the user-defined relationships. The dedicated channel is arranged to enable interactive activity between members of the group.

In another particular embodiment, a method is disclosed that includes storing a status of user activity with respect to each of a plurality of television-based user devices in a database coupled to a service provider network. The method also includes storing indicators of user-defined relationships between respective users of the plurality of television-based user devices in the database. The method further includes providing a dedicated channel accessible to a group of users of the plurality of television-based user devices based on the user-defined relationships. The method also includes enabling interactive activity between members of the group via the dedicated channel.

In another particular embodiment, a system is disclosed that includes a service provider network including an internet protocol television (IPTV) network or a cable television network. The system also includes an active database storing a status of user activity with respect to each of a plurality of television-based user devices supported by the service provider network. The active database also stores indicators of user-defined relationships between respective users of the plurality of television-based user devices. The active database is coupled to the service provider network. The system further includes a dedicated user-defined channel accessible to an IPTV/CATV enabled social networking group of users of the plurality of television-based user devices based on the user-defined relationships. The dedicated user-defined channel is arranged to enable interactive activity between members of the IPTV/CATV enabled social networking group.

Referring to FIG. 1, a block diagram of a first particular embodiment of a system to provide a dedicated channel accessible to a group of users of television-based user devices is depicted and generally designated 100. In the system 100, a first television-based user device 102, a second television-based user device 104, a third television-based user device 106, and a fourth television-based user device 108 are coupled to a database 112 via a service provider network 110. The service provider network 110 is configured to communicate with each of the television-based user devices 102, 104, 106, and 108. In a particular embodiment, the service provider network 110 is an internet protocol television (IPTV) network. In an alternative embodiment, the service provider network 110 is a cable television (CATV) network.

A status of user activity with respect to each of the television-based user devices 102, 104, 106, and 108 is stored in the database 112. In a particular embodiment, the status of user activity is determined by monitoring a set-top box activity or a channel changing activity. For example, the service provider network 110 may be able to identify which user is using which television-based user device by monitoring the set-top box activity or the channel changing activity of each of the television-based user devices 102, 104, 106, and 108.

In a particular embodiment, the status of user activity is determined by a user of one of the television-based user devices 102, 104, 106, 108. For example, the television-based user device 102 may be in Atlanta and the status of user activity may be "inactive," either because the television is off or because the user in Atlanta has turned on a "privacy" or a "do not disturb" feature. Using the "privacy" or "do not disturb" feature, even if the user in Atlanta is watching the television, the database 112 may show an "unavailable" or an "inactive" type of status of user activity for the user in Atlanta.

A dedicated IPTV/CATV enabled social networking channel, shown as dedicated channel 721 in FIG. 1, is provided to each of the television-based user devices 102, 104, 106, and 108. For example, the television-based user device 104 may be in St. Louis, the status of user activity may be "active," and the user may be tuned to the dedicated channel 721. Similarly, the television-based user device 106 may be in Dallas, the status of user activity may be "active," and the user may also be tuned to the dedicated channel 721. Likewise, the television-based user device 108 may be in San Antonio, the status of user activity may be "active," but the user may not be tuned to the dedicated channel 721.

The dedicated channel 721 may be arranged to enable an interactive activity between the user in St. Louis and the user in Dallas, for example. When the user in Dallas tunes to the dedicated channel 721, the user sees who else in the user's IPTV/CATV enabled social networking group is "active" and tuned in to the dedicated channel 721 (e.g., the user in St. Louis), who else is "active" but not tuned in to the dedicated channel 721 (e.g., the user in San Antonio), and who else is "inactive" (e.g., the user in Atlanta). The user in Dallas may invite the members in the user's IPTV/CATV enabled social networking group who are "active" and tuned in to the dedicated channel 721 to participate in a IPTV/CATV enabled social networking activity. In the embodiment illustrated in FIG. 1, the user in St. Louis is a member of the IPTV/CATV enabled social networking group tuned in to the dedicated channel 721. The user in Dallas may invite the user in St. Louis to participate in a video conference, through webcams on the televisions or on the set-top boxes, play games such as chess, bridge, or other games, share a family photo album, watch particular content together, or recommend content to each other, among other alternatives. The dedicated channel 721 is a private IPTV/CATV enabled social networking channel that may be customized for content and for impromptu or planned interactive activities. For example, the dedicated channel 721 may be customized so that every Tuesday night at 7:00 PM CST the users in Dallas, San Antonio, Atlanta, and St. Louis play bridge together via the dedicated channel 721.

Figure 2:
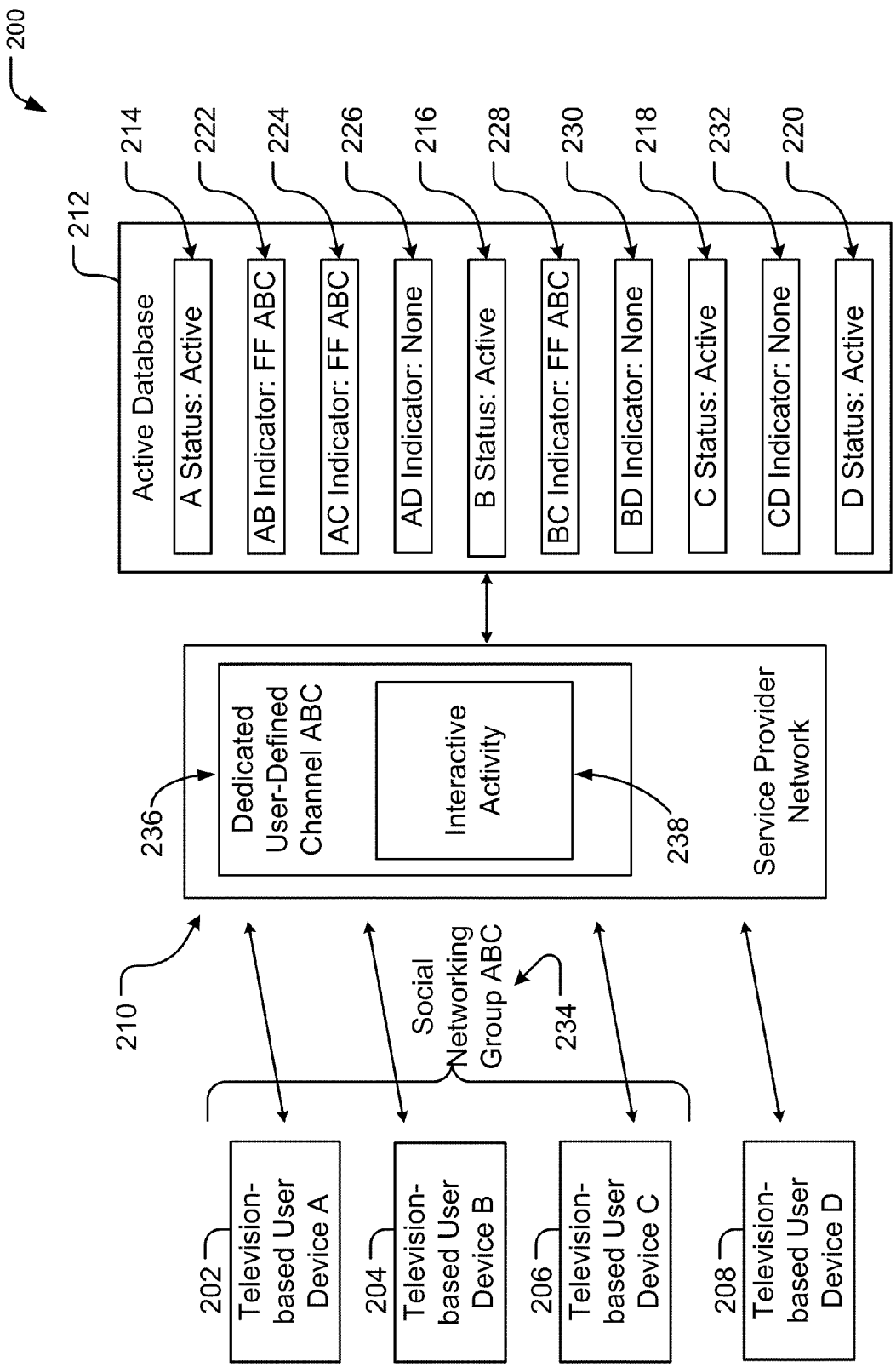
FIG. 2 is a block diagram of a second particular embodiment of a system to provide a dedicated channel accessible to a group of users.

Referring to FIG. 2, a block diagram of a second particular embodiment of a system to provide a dedicated channel accessible to a group of users of television-based user devices is depicted and generally designated 200. The system 200 includes a first television-based user device A 202, a second television-based user device B 204, a third television-based user device C 206, and a fourth television-based user device D 208 that are each coupled to a service provider network 210. For example, the service provider network 210 may be an internet protocol television (IPTV) network or a cable television (CATV) network. The service provider network 210 is coupled to an active database 212.

The active database 212 stores a status of user activity with respect to each of the first television-based user device A 202, the second television-based user device B 204, the third television-based user device C 206, and the fourth television-based user device D 208. For example, A's status of user activity 214 may be "active," B's status of user activity 216 may be "active," C's status of user activity 218 may be "active," and D's status of user activity 220 may be "active."

The active database 212 also stores indicators of user-defined relationships between respective users of the first television-based user device A 202, the second television-based user device B 204, the third television-based user device C 206, and the fourth television-based user device D 208. For example, an AB relationship indicator 222 between A and B may be IPTV/CATV enabled social networking group ABC (e.g., "FF ABC"), an AC relationship indicator 224 between A and C may be IPTV/CATV enabled social networking group ABC, an AD relationship indicator 226 between A and D may be "none," a BC relationship indicator 228 between B and C may be IPTV/CATV enabled social networking group ABC, a BD relationship indicator 230 between B and D may be "none," and a CD relationship indicator 232 between C and D may be "none." Based on the user-defined relationships, A, B, and C may be members of a IPTV/CATV enabled social networking group ABC 234. Based on the user-defined relationships, D may not be a member of the IPTV/CATV enabled social networking group ABC 234.

As shown in FIGS. 2, A, B, and C each have access to a dedicated user-defined channel ABC 236, but D does not have access to the dedicated user-defined channel ABC 236. The dedicated user-defined channel ABC 236 enables A, B, and C to participate in an interactive activity 238. For example, the interactive activity 238 may include video conferencing, game playing, picture sharing, watching particular content, or recommending content, or any combination thereof. A and C may be able to view B's photo album of pictures from B's trip to Ireland, for example, via the dedicated user-defined channel ABC 236. D may be added by having A, B, or C invite D to join the group.

Figure 3:
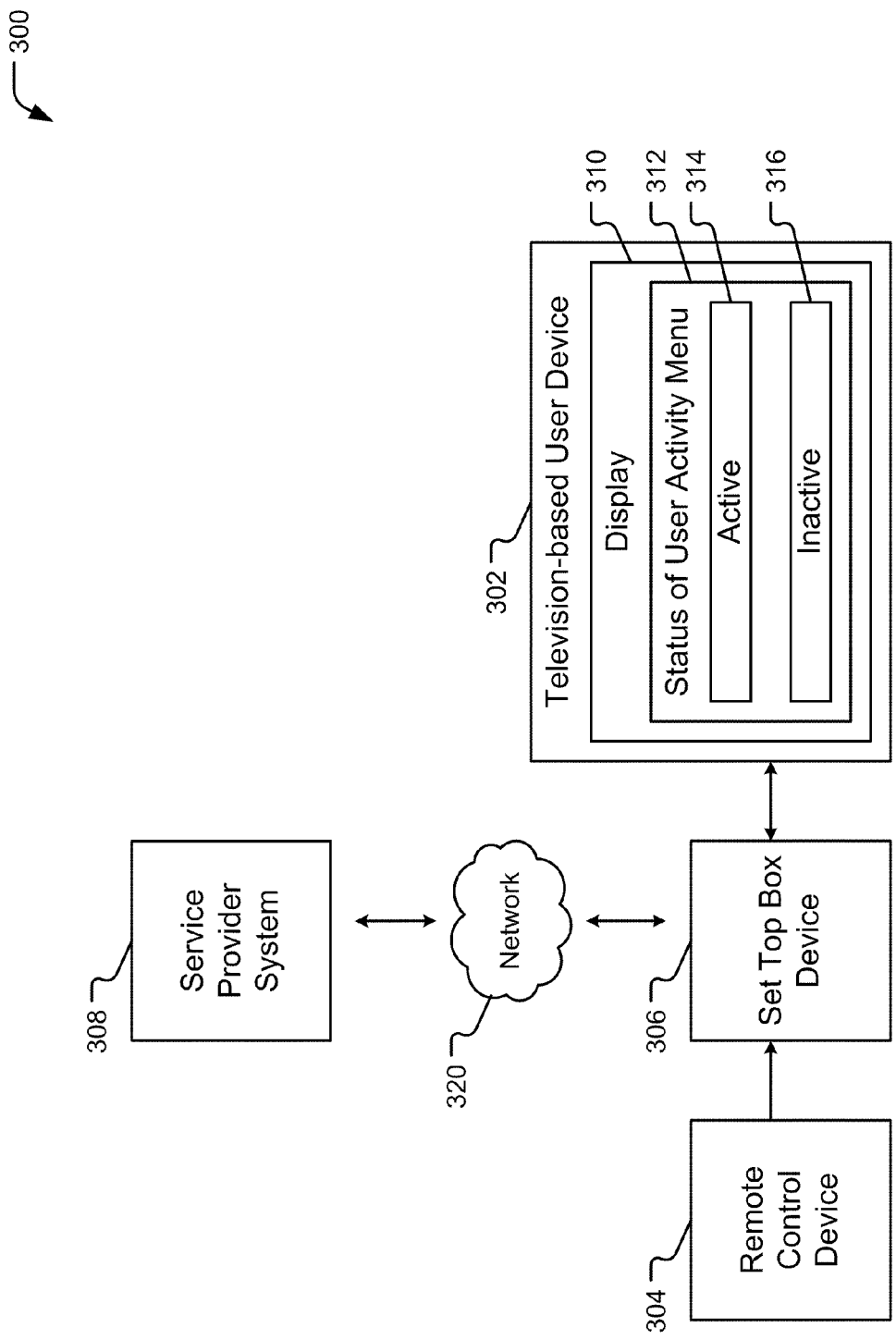
FIG. 3 is a block diagram of a third particular embodiment of a system to provide a dedicated channel accessible to a group of users, displaying a status of user activity menu.

Referring to FIG. 3, a block diagram of a third particular embodiment of a system to provide a dedicated channel accessible to a group of users of television-based user devices, displaying a status of user activity menu, is depicted and generally designated 300. The system 300 includes a television-based user device 302 coupled to a set-top box device 306. The set-top box device 306 is responsive to a remote control device 304. The set-top box device 306 is coupled to a network 320 (e.g., an IPTV network or a CATV network). The network 320 is coupled to a service provider system 308. The television-based user device 302 includes a display 310. The display 310 is shown displaying a status of user activity menu 312. The status of user activity menu 312 has an "active" indicator 314 and an "inactive" indicator 316. A user of the television-based user device 302 may determine the status of user activity by choosing either the "active" indicator 314 or the "inactive" indicator 316 from the status of user activity menu 312 using either a button on the remote control device 304 or a button on the set-top box device 306, for example. By choosing the "inactive" indicator 316 from the status of user activity menu 312, the user of the television-based user device 302 may turn on a "privacy" or a "do not disturb" feature. Using the "privacy" or "do not disturb" feature, even if the user of the television-based user device 302 is watching the television, the active database 212 of FIG. 2 may show an "inactive" type of status of user activity for the user of the television-based user device 302.

Using the status of user activity menu 312 is one way of updating the status of user activity in an active database, such as the active database 212 of FIG. 2. The status of user activity of the user of the television-based user device 302 may also be updated automatically, for example, by monitoring the set-top box device 306 activity (e.g., the pressing of a button on the set-top box device 306) or the channel changing activity of the remote control device 304.

Figure 4:
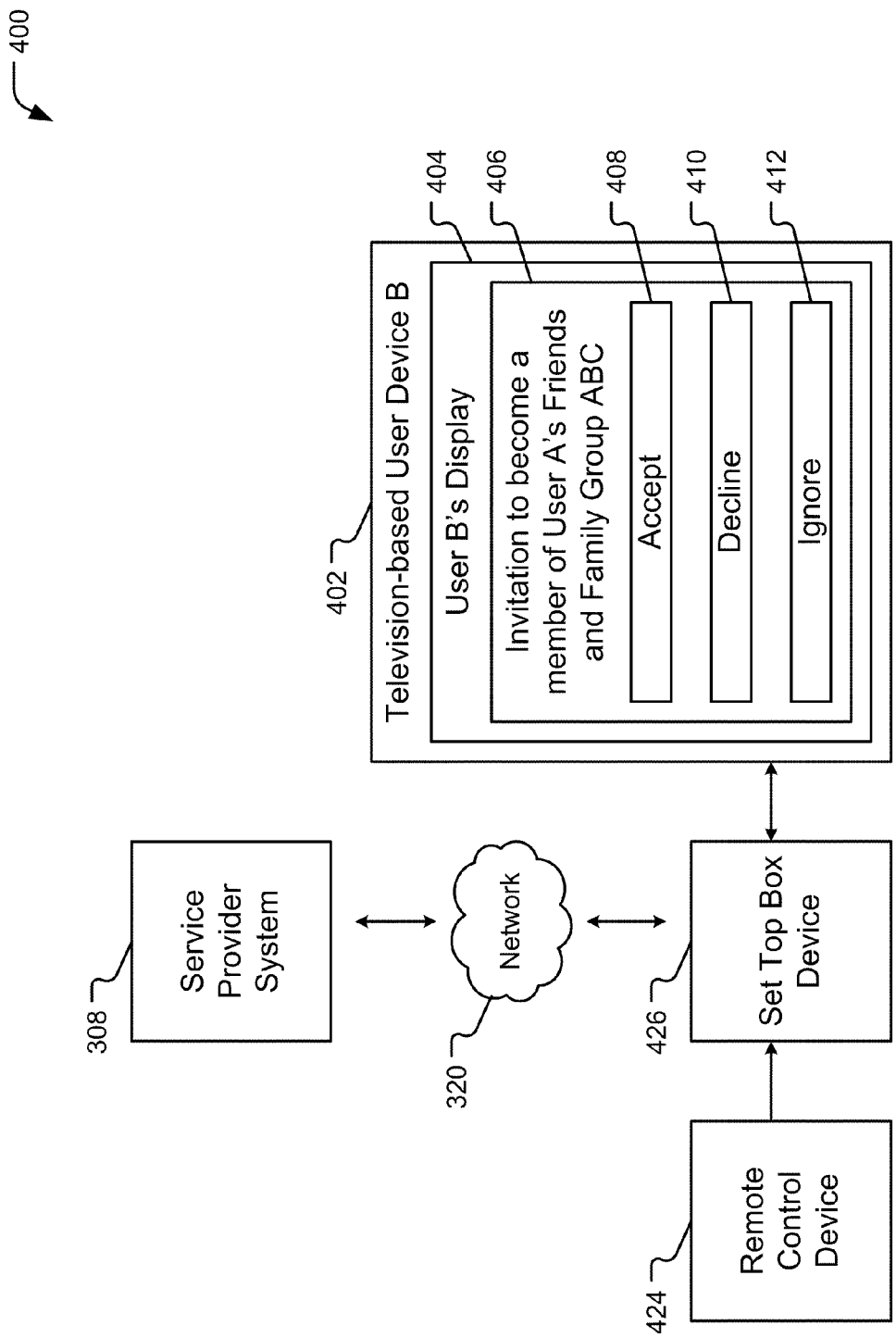
FIG. 4 is a block diagram of the third particular embodiment of a system to provide a dedicated channel accessible to a group of users, displaying an invitation to become a member of a user's group.

Referring to FIG. 4, a block diagram of the third particular embodiment of a system to provide a dedicated channel accessible to a group of users of television-based user devices, displaying an invitation to become a member of a user's group, is depicted and generally designated 400. The system 400 includes a television-based user device B 402 coupled to a set-top box device 426. The set-top box device 426 is responsive to a remote control device 424. The set-top box device 426 is coupled to the network 320. The network 320 is coupled to the service provider system 308. The television-based user device B 402 includes user B's display 404. User B's display 404 is shown displaying an invitation 406 to become a member of user A's IPTV/CATV enabled social networking group ABC. The invitation 406 has an "accept" indicator 408, a "decline" indicator 410, and an "ignore" indicator 412. In a particular embodiment, an indicator of a user-defined relationship between A and B, such as the AB relationship indicator 222 of FIG. 2, may be determined by A inviting B to become a member of A's IPTV/CATV enabled social networking group ABC. User B may respond to the invitation 406 by choosing either the "accept" indicator 408, the "decline" indicator 410, or the "ignore" indicator 412 from the invitation 406 using either the remote control device 424 or the set-top box device 426. D could be added by A, B, or C inviting D to become a member of a IPTV/CATV enabled social networking group ABCD. If D accepted an invitation, similar to the invitation 406, the AD relationship indicator 226 of FIG. 2, the BD relationship indicator 230, and the CD relationship indicator 232 would be updated in the active database 212, accordingly.

Figure 5:
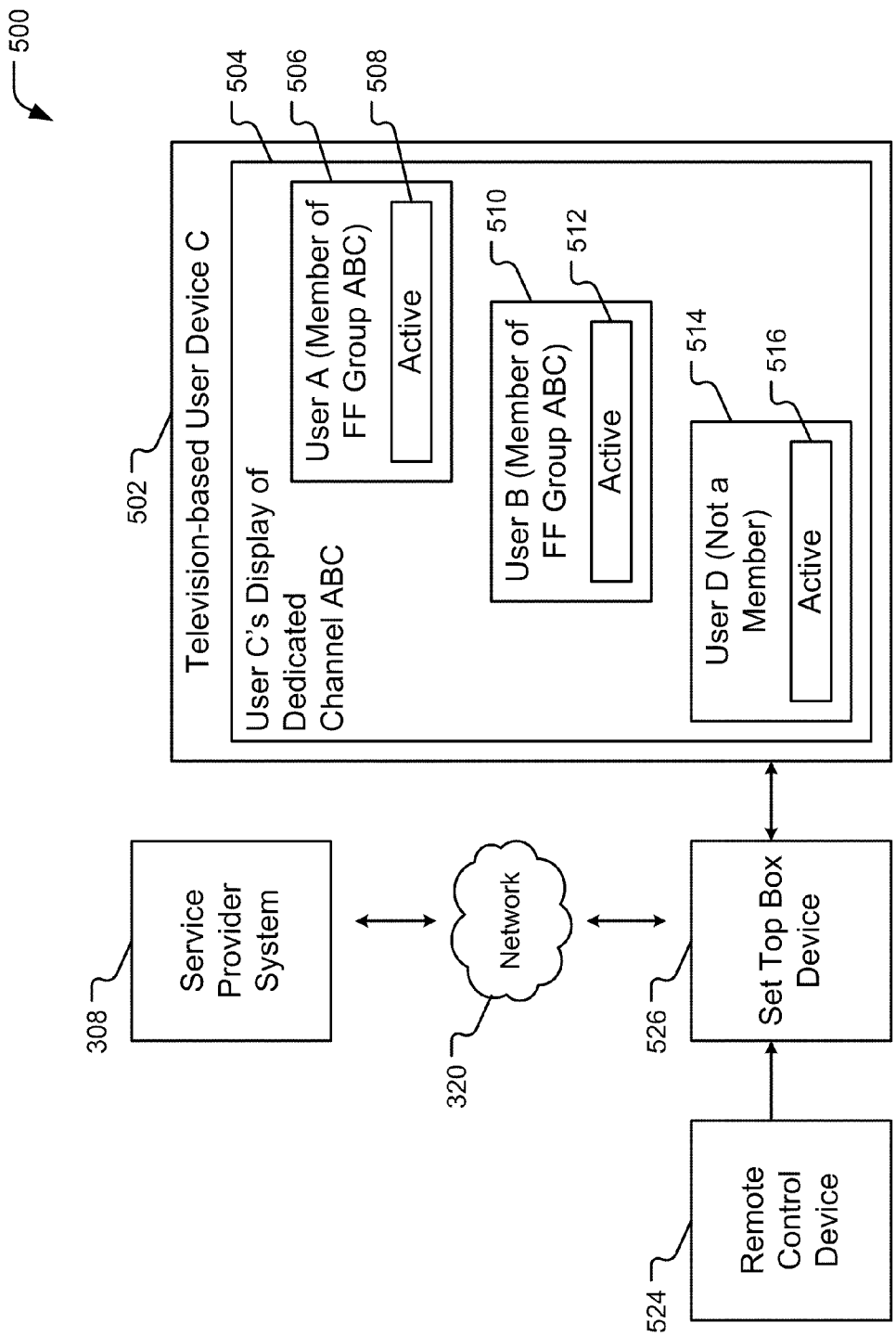
FIG. 5 is a block diagram of the third particular embodiment of a system to provide a dedicated channel accessible to a group of users, displaying a user's view of a dedicated channel.

Referring to FIG. 5, a block diagram of the third particular embodiment of a system to provide a dedicated channel accessible to a group of users of television-based user devices, displaying a user's view of a dedicated channel, is depicted and generally designated 500. The system 500 includes a television-based user device C 502 coupled to a set-top box device 526. The set-top box device 526 is responsive to a remote control device 524. The set-top box device 526 is coupled to the network 320. The network 320 is coupled to the service provider system 308. The television-based user device C 502 includes user C's display 504 of dedicated channel ABC. User C's display 504 is shown displaying an indication 506 that user A is a member of IPTV/CATV enabled social networking group ABC and that user A's status of user activity 508 is "active," an indication 510 that user B is a member of IPTV/CATV enabled social networking group ABC and that user B's status of user activity 512 is "active," and an indication 514 that user D is not a member of IPTV/CATV enabled social networking group ABC and that user D's status of user activity 516 is "active." As described above with reference to FIG. 4, user C could invite user D to become a member of IPTV/CATV enabled social networking group ABCD. Based on the indications 506 and 510, user C may decide to invite one or both of user A and user B to participate in an interactive activity.

Figure 6:
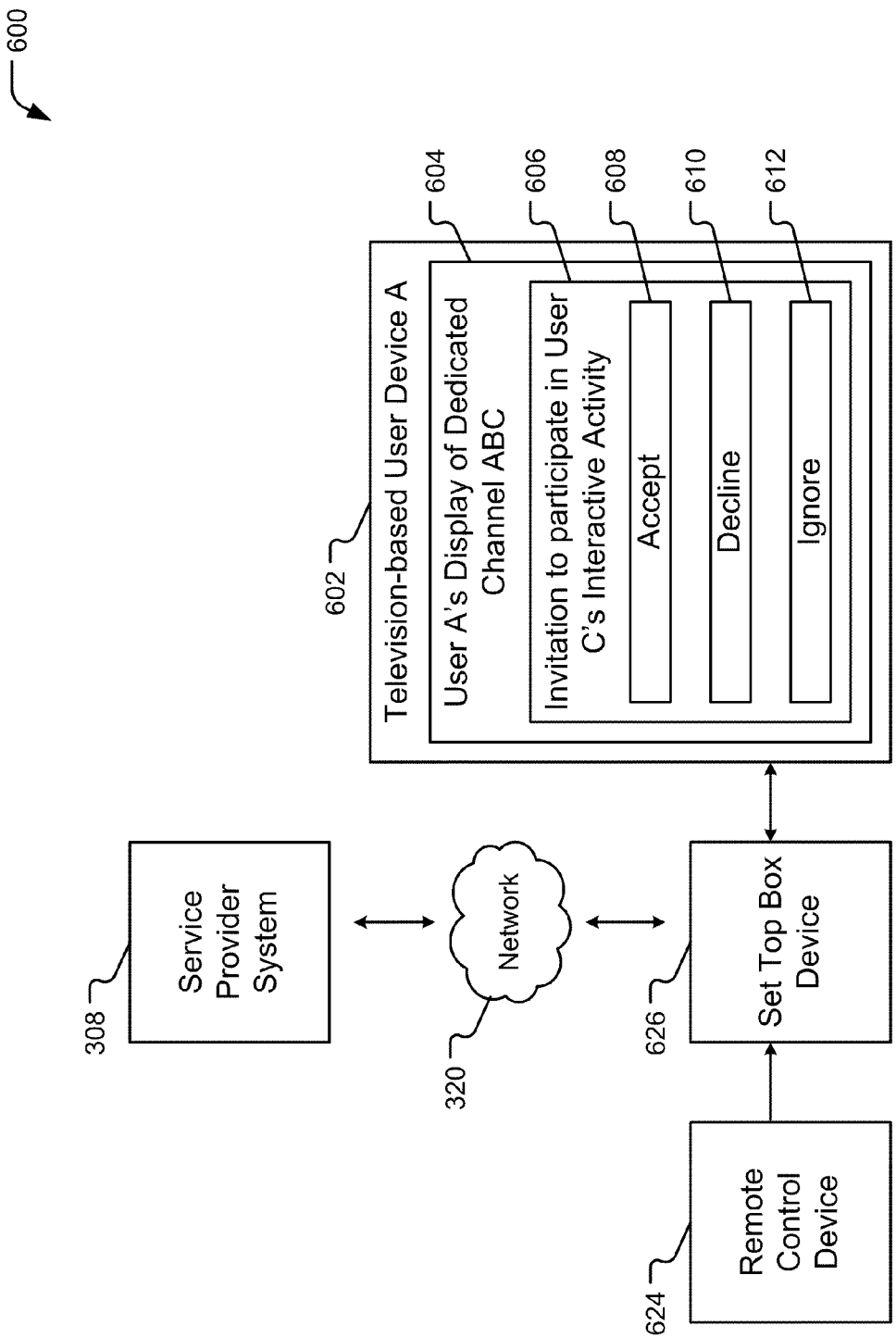
FIG. 6 is a block diagram of the third particular embodiment of a system to provide a dedicated channel accessible to a group of users, displaying an invitation to participate in a user's interactive activity.

Referring to FIG. 6, a block diagram of the third particular embodiment of a system to provide a dedicated channel accessible to a group of users of television-based user devices, displaying an invitation to participate in a user's interactive activity, is depicted and generally designated 600. The system 600 includes a television-based user device A 602 coupled to a set-top box device 626. The set-top box device 626 is responsive to a remote control device 624. The set-top box device 626 is coupled to the network 320. The network 320 is coupled to the service provider system 308. The television-based user device A 602 includes user A's display 604 of dedicated channel ABC. User A's display 604 is shown displaying an invitation 606 to participate in user C's interactive activity. The invitation 606 has an "accept" indicator 608, a "decline" indicator 610, and an "ignore" indicator 612. User A may respond to the invitation 606 by choosing either the "accept" indicator 608, the "decline" indicator 610, or the "ignore" indicator 612 from the invitation 606 using either the remote control device 624 or the set-top box device 626. If user A chooses the "accept" indicator 608, user C may be sent a message informing user C of user A's choice, and user A may be shown a menu of user C's interactive activities, as described more fully below in reference to FIG. 7. If user A chooses either the "decline" indicator 610 or the "ignore" indicator 612, user C may be sent a message informing user C of user A's choice.

In a particular embodiment, a user invites one or more members of the user's group to participate in an interactive activity by sending an invitation to the one or more members of the user's group based on the status of user activity of each of the one or more members of the user's group. For example, user C has invited user A to participate in user C's interactive activity by sending user A the invitation 606, where user A is a member of user C's IPTV/CATV enabled social networking group ABC, as shown by the indication 506 of FIG. 5, and where user A's status of user activity 508 of FIG. 5 is "active." User C may also invite user B to participate in user C's interactive activity by sending the invitation 606 to user B, where user B is also a member of user C's IPTV/CATV enabled social networking group ABC, as shown by the indication 510 of FIG. 5, and where user B's status of user activity 512 of FIG. 5 is also "active."

Figure 7:
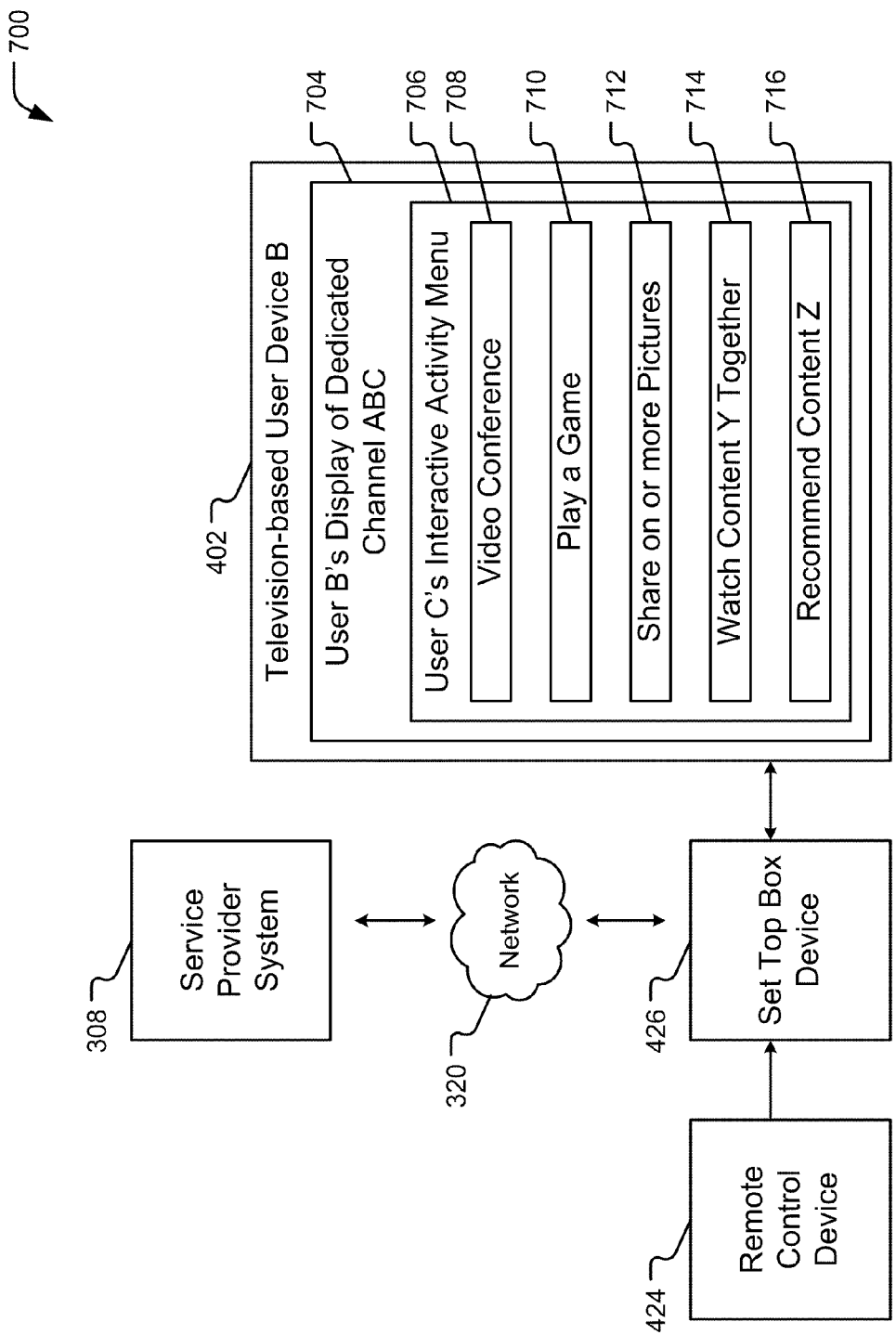
FIG. 7 is a block diagram of the third particular embodiment of a system to provide a dedicated channel accessible to a group of users, displaying a user's interactive activity menu.

Referring to FIG. 7, a block diagram of the third particular embodiment of a system to provide a dedicated channel accessible to a group of users of television-based user devices, displaying a user's interactive activity menu, is depicted and generally designated 700. The system 700 includes the television-based user device B 402 coupled to the set-top box device 426. The set-top box device 426 is responsive to the remote control device 424. The set-top box device 426 is coupled to the network 320. The network 320 is coupled to the service provider system 308. The television-based user device B 402 includes user B's display 704 of dedicated channel ABC. User B's display 704 is shown displaying user C's interactive activity menu 706. User C's interactive activity menu 706 has a "video conference" indicator 708, a "play a game" indicator 710, a "share one or more pictures" indicator 712, a "watch content Y together" indicator 714, and a "recommend content Z" indicator 716. User B may respond to user C's interactive activity menu 706 by choosing either the "video conference" indicator 708, the "play a game" indicator 710, the "share one or more pictures" indicator 712, the "watch content Y together" indicator 714, or the "recommend content Z" indicator 716 from user C's interactive activity menu 706 using either the remote control device 424 or the set-top box device 426. User C's interactive activity menu 706 is displayed on user B's display 704 after user B accepts an invitation like the invitation 606 of FIG. 6.

If user B chooses the "video conference" indicator 708, for example, user B's display 704 may show video of user C captured by a webcam at user C's location and may optionally show video of user B in an inset screen captured by a webcam at user B's location. If user B chooses the "play a game" indicator 710, for example, user B's display 704 may show a menu of available games that may be played. If user B chooses the "share one or more pictures" indicator 712, for example, user B's display 704 may show one or more photo albums containing C's pictures, B's pictures, or any combination thereof. If user B chooses the "watch content Y together" indicator 714, for example, user B's display 704 may start showing content Y. If user B chooses the "recommend content Z" indicator 716, for example, user B's display 704 may show a preview of content Z, a review of content Z, or may start showing content Z.

Figure 8:
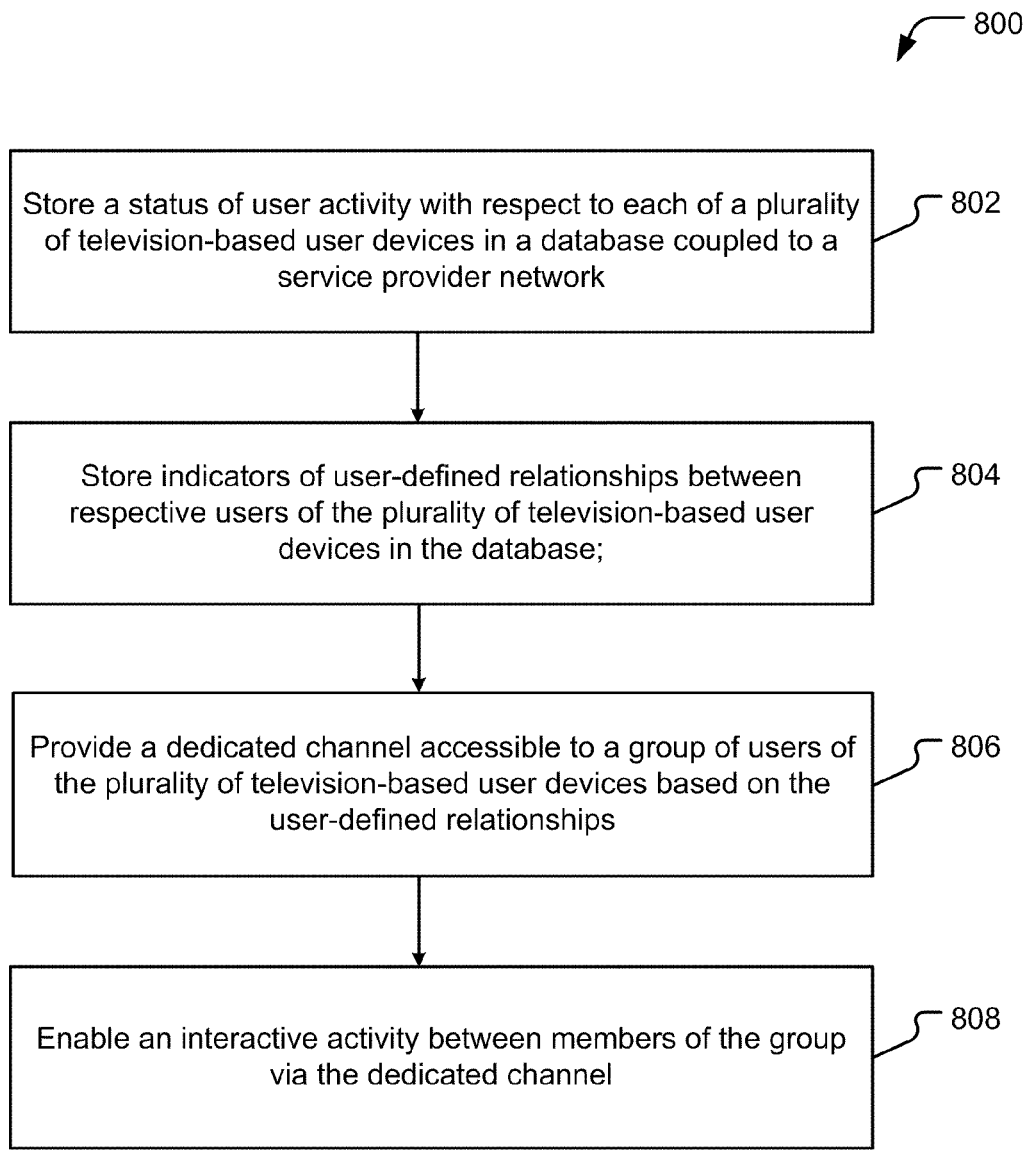
FIG. 8 is a flow diagram of a particular embodiment of a method to provide a dedicated channel accessible to a group of users.

FIG. 8 is a flow diagram of a particular embodiment of a method to provide a dedicated channel accessible to a group of users. The method 800 includes storing a status of user activity with respect to each of a plurality of television-based user devices in a database coupled to a service provider network, at 802. For example, the active database 212 of FIG. 2 may store a status of user activity with respect to each of the first television-based user device A 202, the second television-based user device B 204, the third television-based user device C 206, and the fourth television-based user device D 208. A's status of user activity 214 may be "active," B's status of user activity 216 may be "active," C's status of user activity 218 may be "active," and D's status of user activity 220 may be "active," for example. Alternatively, the status of user activity with respect to a television-based user device may be "inactive," either because the television is off, there has been no set-top box device activity or channel changing activity for a certain period of time, or the user has turned on a "privacy" or "do not disturb" feature, as described above with reference to FIG. 3.

In a particular embodiment, the service provider network is an internet protocol television (IPTV) network or a cable television (CATV) network. In a particular embodiment, the status of user activity is determined by monitoring a set-top box activity or a channel changing activity, as described above with reference to FIG. 3. In a particular embodiment, the status of user activity for a particular device of a plurality of television-based user devices is determined by a user of the particular device, as described above with reference to the status of user activity menu 312 of FIG. 3.

The method 800 also includes storing indicators of user-defined relationships between respective users of the plurality of television-based user devices in the database, at 804. For example, the active database 212 of FIG. 2 may also store indicators of user-defined relationships between respective users of the first television-based user device A 202, the second television-based user device B 204, the third television-based user device C 206, and the fourth television-based user device D 208. The AB relationship indicator 222 between A and B may be IPTV/CATV enabled social networking group ABC, the AC relationship indicator 224 between A and C may be IPTV/CATV enabled social networking group ABC, the AD relationship indicator 226 between A and D may be "none," the BC relationship indicator 228 between B and C may be IPTV/CATV enabled social networking group ABC, the BD relationship indicator 230 between B and D may be "none," and the CD relationship indicator 232 between C and D may be "none," for example. In a particular embodiment, the indicators of the user-defined relationships are determined by having a user invite one or more other users to become members of the user's group, as described above with reference to the invitation 406 of FIG. 4.

The method 800 further includes providing a dedicated channel accessible to a group of users of the plurality of television-based user devices based on the user-defined relationships, at 806. For example, as shown in FIGS. 2, A, B, and C each have access to a dedicated user-defined channel ABC 236, but D does not have access to the dedicated user-defined channel ABC 236. Based on the user-defined relationships shown in FIG. 2 (e.g., the AB relationship indicator 222, the AC relationship indicator 224, and the BC relationship indicator 228), A, B, and C may be members of the IPTV/CATV enabled social networking group ABC 234. Similarly, based on the user-defined relationships shown in FIG. 2 (e.g., the AD relationship indicator 226, the BD relationship indicator 230, and the CD relationship indicator 232), D may not be a member of the IPTV/CATV enabled social networking group ABC 234.

The method 800 also includes enabling an interactive activity between members of the group via the dedicated channel, at 808. For example, the dedicated user-defined channel ABC 236 of FIG. 2 enables A, B, and C to participate in the interactive activity 238. Similarly, the dedicated channel ABC of FIGS. 5-7 enables user C, for example, to check on the status of user activity of user A and user B. The dedicated channel ABC of FIGS. 5-7 also enables user C to invite one or both of user A and user B to participate in an interactive activity chosen from user C's interactive activity menu 706 of FIG. 7, for example.

In a particular embodiment, a user invites one or more members of the user's group to participate in an interactive activity by sending an invitation to the members of the user's group based on the status of user activity of each of the members of the user's group. For example, as described above with reference to FIG. 5, based on the indications 506 and 510, user C may decide to invite user A and user B to participate in an interactive activity by sending the invitation 606 of FIG. 6 to user A and user B. In a particular embodiment, the members of a group who have received an invitation to participate in an interactive activity have an option to accept the invitation, decline the invitation, or ignore the invitation. For example, as described above with reference to FIG. 6, user A may respond to the invitation 606 by choosing either the "accept" indicator 608, the "decline" indicator 610, or the "ignore" indicator 612 from the invitation 606 using either the remote control device 624 or the set-top box device 626.

In a particular embodiment, the interactive activity includes video conferencing, game playing, picture sharing, watching a particular content together, or recommending content, or any combination thereof. For example, as described above with reference to FIG. 7, user B may respond to user C's interactive activity menu 706 by choosing either the "video conference" indicator 708, the "play a game" indicator 710, the "share one or more pictures" indicator 712, the "watch content Y together" indicator 714, or the "recommend content Z" indicator 716 from user C's interactive activity menu 706 using either the remote control device 424 of FIG. 4 or the set-top box device 426.

Figure 9:
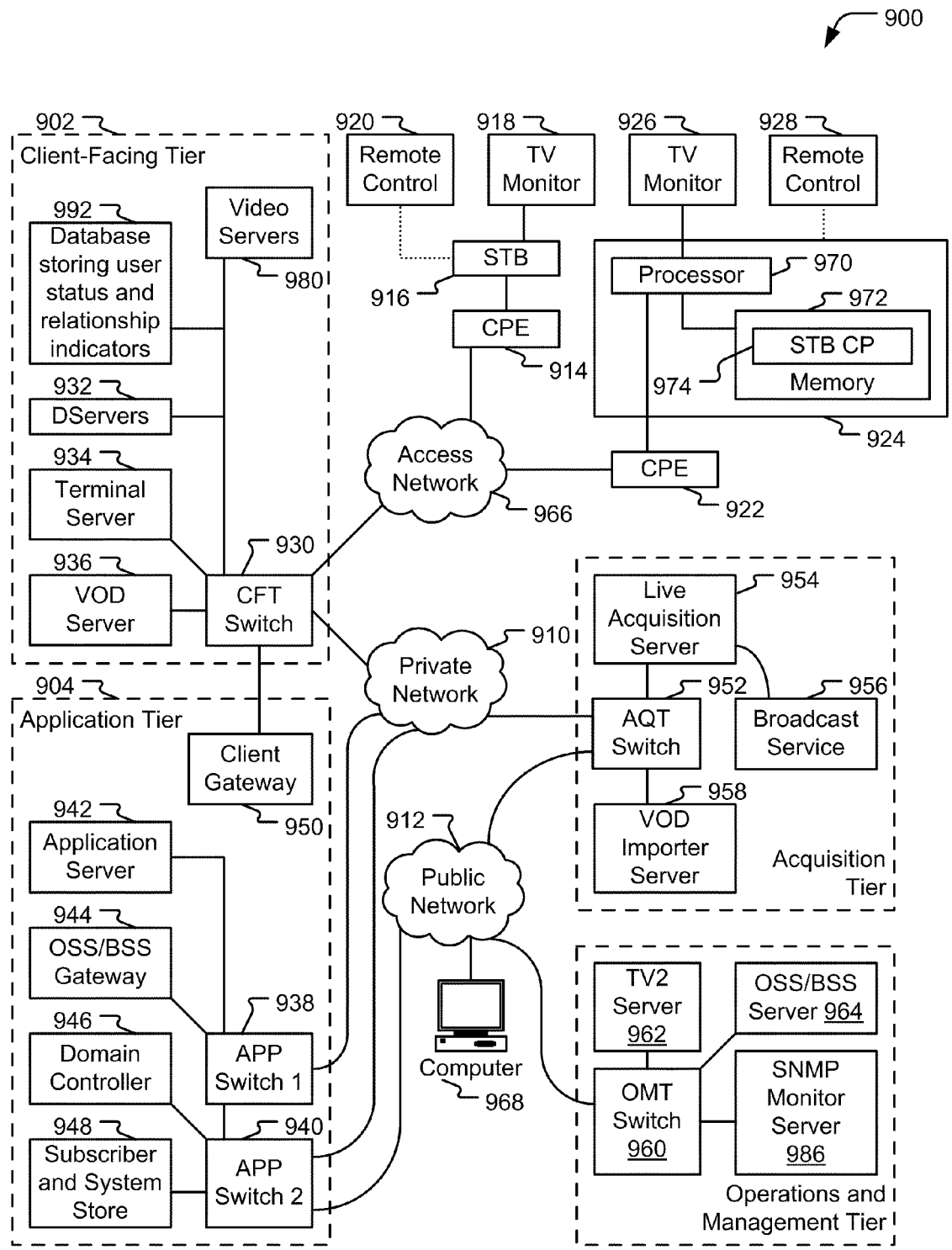
FIG. 9 is a block diagram of an illustrative embodiment of an internet protocol television (IPTV) system.

Referring to FIG. 9, an illustrative embodiment of an Internet Protocol Television (IPTV) system that may be used to share private media content is illustrated and is generally designated 900. For example, the IPTV system 900 may be the system 100 of FIG. 1, the system 200 of FIG. 2, or the system 300 of FIG. 3. As shown, the system 900 can include a client-facing tier 902, an application tier 904, an acquisition tier 906, and an operations and management tier 908. Each tier 902, 904, 906, 908 is coupled to a private network 910; to a public network 912, such as the Internet; or to both the private network 910 and the public network 912. For example, the client-facing tier 902 can be coupled to the private network 910. Further, the application tier 904 can be coupled to the private network 910 and to the public network 912. The acquisition tier 906 can also be coupled to the private network 910 and to the public network 912. Additionally, the operations and management tier 908 can be coupled to the public network 912.

As illustrated in FIG. 9, the various tiers 902, 904, 906, 908 communicate with each other via the private network 910 and the public network 912. For instance, the client-facing tier 902 can communicate with the application tier 904 and the acquisition tier 906 via the private network 910. The application tier 904 can communicate with the acquisition tier 906 via the private network 910. Further, the application tier 904 can communicate with the acquisition tier 906 and the operations and management tier 908 via the public network 912. Moreover, the acquisition tier 906 can communicate with the operations and management tier 908 via the public network 912. In a particular embodiment, elements of the application tier 904, including, but not limited to, a client gateway 950, can communicate directly with the client-facing tier 902.

The client-facing tier 902 can communicate with user equipment via an access network 966, such as an Internet Protocol Television (IPTV) access network. For example, the access network 966 may be the service provider network 110 of FIG. 1, the service provider network 210 of FIG. 2, or the network 320 of FIG. 3. In an illustrative embodiment, customer premises equipment (CPE) 914, 922 can be coupled to a local switch, router, or other device of the access network 966. The client-facing tier 902 can communicate with a first representative set-top box device 916 (e.g., the set-top box device 426 of FIG. 4) at a first customer premises (e.g., the user premises 104 in St. Louis of FIG. 1) via the first CPE 914 and with a second representative set-top box device 924 (e.g., the set-top box device 526 of FIG. 5) at a second customer premises (e.g., the user premises 106 in Dallas of FIG. 1) via the second CPE 922. The CPE 914, 922 can include routers, local area network devices, modems, such as digital subscriber line (DSL) modems, any other suitable devices for facilitating communication between a set-top box device and the access network 966, or any combination thereof.

In a particular embodiment, the client-facing tier 902 can be coupled to the CPE 914, 922 via fiber optic cables. Alternatively, the CPE 914, 922 can be digital subscriber line (DSL) modems that are coupled to one or more network nodes via twisted pairs, and the client-facing tier 902 can be coupled to the network nodes via fiber-optic cables. Each set-top box device 916, 924 can process data received via the access network 966, via an IPTV software platform, such as Microsoft® TV IPTV Edition.

The first set-top box device 916 can be coupled to a first external display device (e.g., user B's display 404 of FIG. 4), such as a first television monitor 918, and the second set-top box device 924 can be coupled to a second external display device (e.g., user C's display 504 of FIG. 5), such as a second television monitor 926. The first external display device and the second external display device may display the user interfaces shown in FIGS. 3-7, for example. Moreover, the first set-top box device 916 can communicate with a first remote control 920 (e.g., the remote control device 424 of FIG. 4), and the second set-top box device 924 can communicate with a second remote control 928 (e.g., the remote control device 524 of FIG. 5). The set-top box devices 916, 924 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 916, 924 can receive data, video, or any combination thereof, from the client-facing tier 902 via the access network 966 and render or display the data, video, or any combination thereof, at the display device 918, 926 to which it is coupled. In an illustrative embodiment, the set-top box devices 916, 924 can include tuners that receive and decode television programming signals or packet streams for transmission to the display devices 918, 926. Further, the set-top box devices 916, 924 can include a STB processor 970 and a STB memory device 972 that is accessible to the STB processor 970. In one embodiment, a computer program, such as the STB computer program 974, can be embedded within the STB memory device 972. In another illustrative embodiment, a user computing device 984, such as a personal computer, laptop or local server, can be coupled to a set-top box device, such as the second representative set-top box device 924, for example, via a universal serial bus (USB) connection or other connection.

In an illustrative embodiment, the client-facing tier 902 can include a client-facing tier (CFT) switch 930 that manages communication between the client-facing tier 902 and the access network 966 and between the client-facing tier 902 and the private network 910. As illustrated, the CFT switch 930 is coupled to one or more data servers, such as D-servers 932, that store, format, encode, replicate, or otherwise manipulate or prepare video content for communication from the client-facing tier 902 to the set-top box devices 916, 924. The CFT switch 930 can also be coupled to a terminal server 934 that provides terminal devices with a connection point to the private network 910. In a particular embodiment, the CFT switch 930 can be coupled to a video-on-demand (VOD) server 936 that stores or provides VOD content imported by the IPTV system 900.

Further, the CFT switch 930 is coupled to one or more video servers 980 that receive video content and transmit the content to the set-top boxes 916, 924 via the access network 966. In a particular embodiment, the CFT switch 930 can be coupled to one or more publication servers 982 that facilitate the formation of groups that share private content and the inclusion of indicators of such private content with video content received by users in a group.

The CFT switch 930 is coupled to a database 992 storing user status and relationship indicators. The database 992 storing user status and relationship indicators may be an example of the database 112 of FIG. 1 or the active database 212 of FIG. 2.

In an illustrative embodiment, the client-facing tier 902 can communicate with a large number of set-top boxes, such as the representative set-top boxes 916, 924 over a wide geographic area, such as a regional area, a metropolitan area, a viewing area, a designated market area or any other suitable geographic area, market area, or subscriber or customer group that can be supported by networking the client-facing tier 902 to numerous set-top box devices. In a particular embodiment, the CFT switch 930, or any portion thereof, can include a multicast router or switch that feeds one or more video streams from a video server to multiple set-top box devices.

As illustrated in FIG. 9, the application tier 904 can communicate with both the private network 910 and the public network 912. The application tier 904 can include a first application tier (APP) switch 938 and a second APP switch 940. In a particular embodiment, the first APP switch 938 can be coupled to the second APP switch 940. The first APP switch 938 can be coupled to an application server 942 and to an OSS/BSS gateway 944. In a particular embodiment, the application server 942 can provide applications to the set-top box devices 916, 924 via the access network 966, which enable the set-top box devices 916, 924 to provide functions, such as display, messaging, processing of IPTV data and VOD material, etc. In a particular embodiment, the OSS/BSS gateway 944 includes operation systems and support (OSS) data, as well as billing systems and support (BSS) data. In one embodiment, the OSS/BSS gateway 944 can provide or restrict access to an OSS/BSS server 964 that stores operations and billing systems data.

The second APP switch 940 can be coupled to a domain controller 946 that provides Internet access, for example, to users at their computers 968 via the public network 912. For example, the domain controller 946 can provide remote Internet access to IPTV account information, e-mail, personalized Internet services, or other online services via the public network 912. In addition, the second APP switch 940 can be coupled to a subscriber and system store 948 that includes account information, such as account information that is associated with users who access the IPTV system 900 via the private network 910 or the public network 912. In an illustrative embodiment, the subscriber and system store 948 can store subscriber or customer data and create subscriber or customer profiles that are associated with IP addresses of corresponding set-top box devices 916, 924.

In a particular embodiment, the application tier 904 can include a client gateway 950 that communicates data directly to the client-facing tier 902. In this embodiment, the client gateway 950 can be coupled directly to the CFT switch 930. The client gateway 950 can provide user access to the private network 910 and the tiers coupled thereto. In an illustrative embodiment, the set-top box devices 916, 924 can access the IPTV system 900 via the access network 966, using information received from the client gateway 950. User devices can access the client gateway 950 via the access network 966, and the client gateway 950 can allow such devices to access the private network 910 once the devices are authenticated or verified. Similarly, the client gateway 950 can prevent unauthorized devices, such as hacker computers or stolen set-top box devices from accessing the private network 910, by denying access to these devices beyond the access network 966.

For example, when the first representative set-top box device 916 accesses the client-facing tier 902 via the access network 966, the client gateway 950 can verify subscriber information by communicating with the subscriber and system store 948 via the private network 910. Further, the client gateway 950 can verify billing information and status by communicating with the OSS/BSS gateway 944 via the private network 910. In one embodiment, the OSS/BSS gateway 944 can transmit a query via the public network 912 to the OSS/BSS server 964. After the client gateway 950 confirms subscriber and/or billing information, the client gateway 950 can allow the set-top box device 916 to access IPTV content and VOD content at the client-facing tier 902. If the client gateway 950 cannot verify subscriber information for the set-top box device 916, e.g., because it is connected to an unauthorized twisted pair, the client gateway 950 can block transmissions to and from the set-top box device 916 beyond the access network 966.

As indicated in FIG. 9, the acquisition tier 906 includes an acquisition tier (AQT) switch 952 that communicates with the private network 910. The AQT switch 952 can also communicate with the operations and management tier 908 via the public network 912. In a particular embodiment, the AQT switch 952 can be coupled to a live acquisition server 954 that receives or acquires television content, movie content, advertisement content, other video content, or any combination thereof, from a broadcast service 956, such as a satellite acquisition system or satellite head-end office. In a particular embodiment, the live acquisition server 954 can transmit content to the AQT switch 952, and the AQT switch 952 can transmit the content to the CFT switch 930 via the private network 910.

In an illustrative embodiment, content can be transmitted to the D-servers 932, where it can be encoded, formatted, stored, replicated, or otherwise manipulated and prepared for communication from the video server(s) 980 to the set-top box devices 916, 924. The CFT switch 930 can receive content from the video server(s) 980 and communicate the content to the CPE 914, 922 via the access network 966. The set-top box devices 916, 924 can receive the content via the CPE 914, 922, and can transmit the content to the television monitors 918, 926. In an illustrative embodiment, video or audio portions of the content can be streamed to the set-top box devices 916, 924.

Further, the AQT switch 952 can be coupled to a video-on-demand importer server 958 that receives and stores television or movie content received at the acquisition tier 906 and communicates the stored content to the VOD server 936 at the client-facing tier 902 via the private network 910. Additionally, at the acquisition tier 906, the video-on-demand (VOD) importer server 958 can receive content from one or more VOD sources outside the IPTV system 900, such as movie studios and programmers of non-live content. The VOD importer server 958 can transmit the VOD content to the AQT switch 952, and the AQT switch 952, in turn, can communicate the material to the CFT switch 930 via the private network 910. The VOD content can be stored at one or more servers, such as the VOD server 936.

When users issue requests for VOD content via the set-top box devices 916, 924, the requests can be transmitted over the access network 966 to the VOD server 936, via the CFT switch 930. Upon receiving such requests, the VOD server 936 can retrieve the requested VOD content and transmit the content to the set-top box devices 916, 924 across the access network 966, via the CFT switch 930. The set-top box devices 916, 924 can transmit the VOD content to the television monitors 918, 926. In an illustrative embodiment, video or audio portions of VOD content can be streamed to the set-top box devices 916, 924.

FIG. 9 further illustrates that the operations and management tier 908 can include an operations and management tier (OMT) switch 960 that conducts communication between the operations and management tier 908 and the public network 912. In the embodiment illustrated by FIG. 9, the OMT switch 960 is coupled to a TV2 server 962. Additionally, the OMT switch 960 can be coupled to an OSS/BSS server 964 and to a simple network management protocol (SNMP) monitor 986 that monitors network devices within or coupled to the IPTV system 900. In a particular embodiment, the OMT switch 960 can communicate with the AQT switch 952 via the public network 912.

Figure 10:
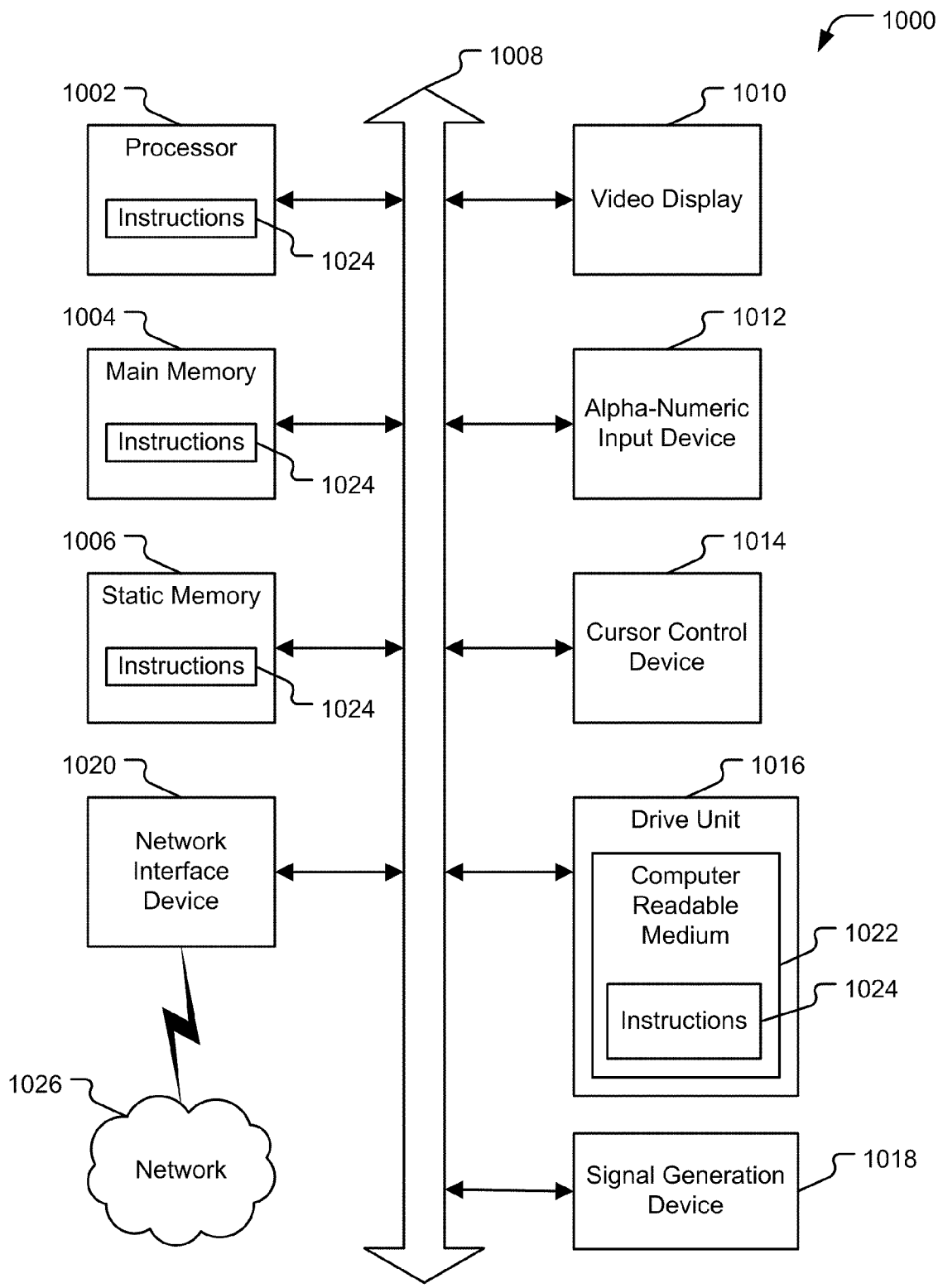
FIG. 10 is a block diagram of an illustrative embodiment of a general computer system.

Referring to FIG. 10, an illustrative embodiment of a general computer system is shown and is designated 1000. The computer system 1000 includes a set of instructions that can be executed to cause the computer system 1000 to perform any one or more of the methods or computer based functions disclosed herein. The computer system 1000, or any portion thereof, may operate as a standalone device or may be connected, e.g., using a network, to other computer systems or peripheral devices.

In a networked deployment, the computer system 1000 may operate in the capacity of a set-top box device, a server, or a mobile computing device, such as the television-based user devices 102, 104, 106, and 108 of FIG. 1, the service provider network 110 of FIG. 1, the database 112 of FIG. 1, the television-based user devices 202, 204, 206, and 208 of FIG. 2, the service provider network 210 of FIG. 2, the active database 212 of FIG. 2, the set-top box device 306 of FIG. 3, the service provider system 308 of FIG. 3, the network 320 of FIG. 3, and the television-based user devices 302 of FIG. 3, 402 of FIG. 4, 502 of FIG. 5, 602 of FIG. 6, and 402 of FIG. 7. The computer system 1000 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics-processing unit (GPU), or both. Moreover, the computer system 1000 can include a main memory 1004 and a static memory 1006 that can communicate with each other via a bus 1008. As shown, the computer system 1000 may further include or be coupled to a video display unit 1010, such as a liquid crystal display (LCD), an organic light emitting diode (OLED), a flat panel display, a cathode ray tube (CRT) display, a solid-state display, or a projection display. Additionally, the computer system 1000 may include an input device 1012, such as a keyboard, a remote control device, and a cursor control device 1014, such as a mouse. The computer system 1000 can also include a disk drive unit 1016, a signal generation device 1018, such as a speaker or remote control device, and a network interface device 1020. The network interface device 1020 may be coupled to other devices (not shown) via a network 1026.

In a particular embodiment, as depicted in FIG. 10, the disk drive unit 1016 may include a computer-readable medium 1022 in which one or more sets of instructions 1024, e.g., software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application-specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionalities as described herein.

The present disclosure contemplates a computer-readable medium that includes instructions 1024 or receives and executes instructions 1024 responsive to a propagated signal, so that a device connected to a network 1026 can communicate voice, video, or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet, other packet switched network transmission (e.g., TCP/IP, UDP/IP, HTML, and HTTP) and standards for viewing media content (e.g., MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a server configured to communicate with a plurality of user devices via an access network; and
   a database storing a status of user activity with respect to each of the plurality of user devices and storing indicators of user-defined relationships between the plurality of user devices, wherein a particular status of a particular user device is automatically updated from inactive to active in response to detecting an input at the particular user device;
   wherein the server is configured to provide a dedicated television channel that is accessible to a first group of user devices of the plurality of user devices based on the user-defined relationships and that is not accessible to a second group of user devices based on the user-defined relationships;
   wherein the first group of user devices includes a first user device and a second user device;
   wherein the second group of user devices includes a third user device;
   wherein the user-defined relationships include a first relationship between the first user device and the third user device and a second relationship between the second user device and the third user device;
   wherein the server is configured to perform a procedure to add the third user device to the first group in response to a signal from the first user device;
   wherein adding the third user device to the first group includes updating the first relationship to indicate that the first user device and the third user device are in the first group and updating the second relationship to indicate that the second user device and the third user device are in the first group;
   wherein the server is configured to send an interaction invitation to the first user device via the dedicated television channel in response to the server receiving a request to send the interaction invitation from the second user device; and
   wherein the server is configured to send an interactivity menu that includes a plurality of interactive options of available interaction types to the first user device via the dedicated television channel in response to received acceptance by the server from the first user device of the interaction invitation.

2. The system of claim 1, wherein the plurality of interactive options includes a video conferencing option, a game playing option, a picture sharing option, a content watching option, a recommendation watching option, or a combination thereof.

3. The system of claim 1, wherein the server is configured to perform the procedure in response to a second signal from the second user device.

4. The system of claim 1, wherein the plurality of user devices includes a set-top box device, a second server, a mobile computing device, a personal computer, a tablet, a personal digital assistant, a first electronic device that provides voice communication, a second electronic device that provides video communication, an electronic device that provides data communication, or any combination thereof.

5. The system of claim 1, wherein the server is configured to send the dedicated television channel to a fourth user device in response to the fourth user device selecting the dedicated television channel if the user-defined relationships indicate that the fourth user device is in the first group, and wherein the server is configured to not send the dedicated television channel to the fourth user device in response to the fourth user device selecting the dedicated television channel if the user-defined relationships indicate that the fourth user device is not in the first group.

6. The system of claim 1, wherein the server is further configured to display the status of user activity with respect to each user device of the first group of user devices via the dedicated television channel.

7. The system of claim 1, wherein the interaction invitation includes a first option to accept the interaction invitation, a second interaction option to decline the invitation, and a third interaction option to ignore the invitation.

8. The system of claim 1, wherein the dedicated television channel is programmable to initiate a weekly interactive game accessible to each user device in the first group of user devices.

9. The system of claim 1, wherein content of the dedicated television channel is customizable based on the interactive options.

10. The system of claim 1, wherein the dedicated television channel is inaccessible to user devices outside of the first group of user devices.

11. The system of claim 1, wherein the dedicated television channel corresponds to a cable television channel.

12. The system of claim 1, wherein the dedicated television channel corresponds to an internet protocol television channel.

13. A method comprising:
   storing, by a server, indicators of user-defined relationships between a plurality of user devices to a database;
   storing, by the server, a status of user activity with respect to each of the plurality of user devices, wherein a particular status of a particular user device is automatically updated from inactive to active in response to detecting an input at the particular user device;
   providing, by the server, a dedicated television channel that is accessible to a first group of user devices of the plurality of user devices based on the user-defined relationships with the server via an access network and that is not accessible to a second group of user devices based on the user-defined relationships, wherein the dedicated television channel is accessible to each user device of the first group of user devices via a common television channel number associated with the dedicated television channel, wherein the first group of user devices includes a first user device and a second user device, wherein the second group of user devices includes a third user device, wherein the user-defined relationships include a first relationship between the first user device and the third user device and a second relationship between the second user device and the third user device;

in response to a signal from the first user device, transmitting a group invitation to the third user device;

in response to receiving acceptance of the group invitation from the third user device, adding, by the server, the third user device to the first group by:
  updating the first relationship to indicate that the first user device and the third user device are in the first group;
  updating the second relationship to indicate that the second user device and the third user device are in the first group;

receiving, at the server from the first user device, a request to send an interaction invitation to the second user device;

sending, from the server, the interaction invitation to the second user device via the dedicated television channel in response to the request;

receive, at the server, acceptance of the interaction invitation from the second user device; and sending, from the server via the dedicated television channel, an interactivity menu that includes a plurality of interactive options of available interaction types to the second user device in response to the acceptance.

14. The method of claim 13, wherein the plurality of interactivity options includes a video conferencing option, a game playing option, a picture sharing option, a content watching option, a recommendation watching option, or a combination thereof.

15. The method of claim 14, further comprising receiving, from the second user device, a selection of an interactivity option of the plurality of interactivity options.

16. The method of claim 15, further comprising, in response to determining that the selection indicates the video conferencing option, displaying a video from a camera associated with the second user device at the first user device via the dedicated television channel.

17. The method of claim 15, further comprising, in response to determining that the selection indicates the game playing option, displaying a menu including titles of a plurality of games at the second user device via the dedicated television channel.

18. The method of claim 15, further comprising, in response to determining that the selection indicates the recommendation watching option, displaying a preview of content recommended by the second user device, a review of the content recommended by the second user device, the content recommended by the second user device, or a combination thereof, at the first user device and at the second user device via the dedicated television channel.

19. A computer-readable storage device comprising instructions executable by a processor to perform operations comprising:
  storing indicators of user-defined relationships between a plurality of user devices in a database, wherein the user devices are coupled via an access network, and wherein the user-defined relationships form groups of user devices;
  storing a status of user activity with respect to each of the plurality of user devices, wherein a particular status of a particular user device is automatically updated from inactive to active in response to detecting an input at the particular user device;
  providing a dedicated channel that is accessible to a social networking group of user devices of the plurality of user devices and that is not accessible to a second group of user devices based on the user-defined relationships, wherein the social networking group is a group of the groups of user devices, wherein the dedicated channel is accessible to each user device of the social networking group via a common channel number associated with the dedicated channel, wherein the social networking group of user devices includes a first user device and a second user device wherein the second group of user devices includes a third user device, wherein the user-defined relationships include a first relationship between the first user device and the third user device and a second relationship between the second user device and the third user device;
  in response to a signal from the first user device, transmitting a group invitation to the third user device;
  in response to receiving acceptance of the group invitation from the third user device, adding the third user device to the social networking group by:
    updating the first relationship to indicate that the first user device and the third user device are in the social networking group;
    updating the second relationship to indicate that the second user device and the third user device are in the social networking group;
  receiving a request to send an interaction invitation to the first user device of the social networking group from the second user device of the social networking group;
  sending the interaction invitation to the first user device via the dedicated channel;
  receiving a second acceptance of the interaction invitation from the first user device; and
  sending an interactivity menu that includes a plurality of interactive options of available interaction types to the first user device via the dedicated channel in response to the acceptance,
  wherein the dedicated channel is available to each user device in the social networking group, and wherein two user devices in the social networking group are in distinct geographic locations.

20. The computer-readable storage device of claim 19, wherein sending the interaction invitation to the first user device comprises sending a menu to the first user device, and wherein the menu includes an accept option, a decline option, and an ignore option.

* * * * *